(12) United States Patent
Paloheimo

(10) Patent No.: US 7,980,170 B2
(45) Date of Patent: Jul. 19, 2011

(54) METHOD AND APPARATUS FOR PREPARING COFFEE DRINKS

(76) Inventor: Matti Paloheimo, Helsinki (FI)

( * ) Notice: Subject to any disclaimer, the term of this patent is extended or adjusted under 35 U.S.C. 154(b) by 1668 days.

(21) Appl. No.: 10/537,030

(22) PCT Filed: Dec. 1, 2003

(86) PCT No.: PCT/FI03/00916
§ 371 (c)(1),
(2), (4) Date: May 31, 2005

(87) PCT Pub. No.: WO2004/049814
PCT Pub. Date: Jun. 17, 2004

(65) Prior Publication Data
US 2006/0016345 A1    Jan. 26, 2006

(30) Foreign Application Priority Data

Nov. 29, 2002    (FI) .................................... 20022109

(51) Int. Cl.
*A47J 31/00*    (2006.01)
*A23F 5/26*    (2006.01)

(52) U.S. Cl. .......... 99/290; 99/302 R; 99/323.3; 99/279; 426/433

(58) Field of Classification Search ............ 99/279–323, 99/326–333, 357, 495, 516, 275, 323.3; 222/129.3, 222/129.2, 129.4, 146.1, 146.2, 146.5; 426/433, 426/435

See application file for complete search history.

(56) References Cited

U.S. PATENT DOCUMENTS

| 3,641,918 | A | | 2/1972 | Schellgell et al. |
| 4,470,999 | A | | 9/1984 | Carpiac |
| 4,550,651 | A | * | 11/1985 | Haynes ........................ 99/279 |
| 4,649,809 | A | * | 3/1987 | Kanezashi .................... 99/290 |
| 5,740,719 | A | * | 4/1998 | Triola et al. ............... 99/302 R |
| 5,975,365 | A | * | 11/1999 | Hsieh ......................... 222/129.4 |
| 6,192,785 | B1 | * | 2/2001 | Trida et al. ..................... 99/284 |
| 6,915,732 | B2 | * | 7/2005 | Jones et al. ................... 99/275 |
| 6,988,641 | B2 | * | 1/2006 | Jones et al. ............... 222/129.1 |
| 7,182,017 | B1 | * | 2/2007 | Knepler et al. ............... 99/279 |
| 2003/0196554 | A1 | * | 10/2003 | Koontz et al. ............. 99/323.3 |
| 2004/0261631 | A1 | * | 12/2004 | Lee .............................. 99/433 |

FOREIGN PATENT DOCUMENTS

WO    01/74211    10/2001
WO    02/01993    1/2002

* cited by examiner

*Primary Examiner* — Reginald L Alexander
(74) *Attorney, Agent, or Firm* — Seppo Laine Oy

(57) ABSTRACT

The invention relates to a method for making coffee-based drinks and to an arrangement in an apparatus for making coffee-based drinks. In this process, coffee is made by means of a so-called expresso method using hot water. High pressure and a short boiling time. According to the method, a strong coffee concentrate is stored in a hermetically sealed heat vessel and the concentrate is either used as such or it is diluted so as to obtain a desired strength at the moment of serving by adding a suitable amount of water to the concentrate in a mixing tank. According to the invention, both expresso-based specialty coffees and ordinary coffee are made by means of the same equipment. The invention also makes it possible to quickly serve large amounts of coffee.

21 Claims, 2 Drawing Sheets

METHOD AND APPARATUS FOR PREPARING COFFEE DRINKS

This is a national stage application filed under 35 USC 371 based on International Application No. PCT/FI2003/000916 filed Dec. 1, 2003, and claims priority under 35 USC 119 of Finnish Patent Application No. 20022109 filed Nov. 29, 2002.

BACKGROUND OF THE INVENTION

The present invention relates to the preparation of coffee drinks, and particularly to the method for making coffee-based drinks.

According to such a method, coffee is made by means of a so-called espresso method using hot water, high pressure and a short boiling time, from fine coffee powder that is ground up from dark roasted coffee beans. Very strong coffee is thus obtained, which can be called a concentrate because of its small amount of water and high content of coffee.

A good taste and the easiness of preparation constitute the basis for the commercial use of coffee. The most difficult task is to make and preserve large amounts of good coffee. In the Nordic Countries, the most familiar way to make coffee is by boiling or filtering so as to make a drink that is easy to enjoy even in larger amounts at a time. In contrast, generally stronger coffee of the espresso type is consumed in the Mediterranean.

For large-scale consumption, coffee is made into a container or separate containers that are used to serve the coffee. The coffee is made either by manual or automatic percolators. Such coffee makers require a lot of space and it is difficult to maintain the quality of the coffee. These percolators are only made to serve so-called filtered coffee.

In the industry, coffee is also made into a concentrate that is packed and frozen in disposable packages (bib), and thawed and placed into special distribution devices before use, wherein some concentrate is mixed with hot water and served as coffee. Coffee is also made of an instant powder, i.e., instant coffee powder, by mixing it with hot water. Instant coffee powder is manufactured industrially by removing water from filtered coffee.

Publication WO A1 01/74211 discloses a solution for making coffee. The coffee is made by mixing water and coffee concentrate that is made in advance by another device. Espresso is also made merely by means of treating with steam, coffee that is stored in advance.

Publications WO A1 02/01993, U.S. Pat. Nos. 4,470,999 and 3,641,918 also disclose a solution, wherein a coffee drink is made of a prefabricated product. The product that is made into a drink can be freeze-dried, ordinary instant coffee powder or a liquid concentrate, which either has been stored or is stored in a cold place or is frozen. The concentrate can also be prepared in advance by another device either by filtering or boiling.

The known technology involves considerable drawbacks. In industrial processes, coffee is first made and then cooled after the process, until heated again in dispensers. Thus, the coffee concentrate is prepared and served by means of separate devices. Heating ready-made coffee is the surest way to spoil its taste and aroma, and reheated coffee cannot compete with the aromas of freshly-made coffee.

At the moment, separate coffee makers are needed to make so-called ordinary coffee and espresso-based types of coffee, which are also called specialty coffees. On the market, there are some combined coffee makers, which can be used to make both filtered coffee and espresso but, in practice, these devices are combinations of two coffee makers intended for small-scale use, combining two cookers within one case. The greatest disadvantage of also these cookers is that they can only make one cup of espresso-based coffee at a time.

Espresso-based coffees and the specialty coffees that are made on the basis of espresso coffee are made at the moment they are served; they cannot be preserved, and the larger the amounts of specialty coffee that are to be made at one time, the more effective and expensive manufacturing devices are needed At present, when large amounts of both ordinary coffee and specialty coffee are made, at least two different coffee makers are needed and more space should be reserved for them; besides, also the investment costs are higher. By means of current devices, only one cup of specialty coffee can be made at a time, therefore, to make large volumes, several cookers are needed, the manufacture is time-consuming, thus slowing down the process of serving specialty coffee.

The purpose of the present invention is to eliminate the disadvantages of the known technology and to provide a new solution for the preparation of coffee drinks.

SUMMARY OF THE INVENTION

The invention is based on the idea that different types of coffee, both those based on espresso and the ordinary, so-called percolated coffee, are made by means of one device.

The invention is further characterized in that a strong coffee concentrate is stored in a hermetically sealed heat vessel, and the concentrate is either used as such or diluted at the moment of serving so as to form a desired concentrate by adding a suitable amount of water into the concentrate in a mixing tank.

The invention provides considerable advantages. By using the solution according to the invention, a large amount of coffee can be made and preserved in a high-quality concentrated form by means of simple equipment. No such device is previously known, which in advance makes and also stores fresh coffee in concentrated form and uses this concentrate to make both ordinary and specialty coffees. The solution presented herein makes it possible to quickly make and serve large amounts of espresso-based coffees. The price and size of such a device are clearly smaller than those of the present solutions that offer a correspondent capacity. The new solution also offers a higher speed of manufacture and service than the known apparatuses. This problem has earlier been solved for ordinary filtered coffee only.

By means of our invention, both ordinary coffee and specialty coffees can be made using the same device. The space needed by the new equipment is clearly smaller than the space needed by the corresponding, current coffee makers together. The price and the energy demand are distinctly lower compared with the two earlier devices that have a corresponding capacity. The new solution also offers a higher manufacturing and serving speed of specialty coffees. This is of importance in the catering business and institutional catering in particular, where large volumes of coffee are to be served quickly.

The invention can also be used in making tea and other hot drinks.

The short manufacturing time, the high pressure and the correct roasting of the espresso method also provide an advantage, which has not been given attention earlier. Because of the quick preparation, the coffee drink seals in the fresh taste and the aromas of coffee, but the undesirable ingredients of coffee bean, such as acids and waste materials, which dissolve as a consequence of a long extraction time, are omitted. Hence, the "ordinary" coffee made in accordance with the invention is more delicious than the conventional filtered coffee that is made by the traditional slow method of extraction, because the finished drink lacks the undesirable flavourings of the coffee bean.

The coffee maker solutions that are presently used commercially are based on processing and serving prefabricated coffee concentrates. No publication discloses a solution, wherein ordinary coffee and specialty coffees can be made, preserved and served by the same equipment, and where the ready-made coffee base can also be used for so-called coffee drinks.

Recently made coffee tastes better and fresher than that made of a concentrate or powder.

BRIEF DESCRIPTION OF THE DRAWINGS

In the following, the invention is studied in detail with the aid of the appended drawing.

DETAILED DESCRIPTION

Figure 1:
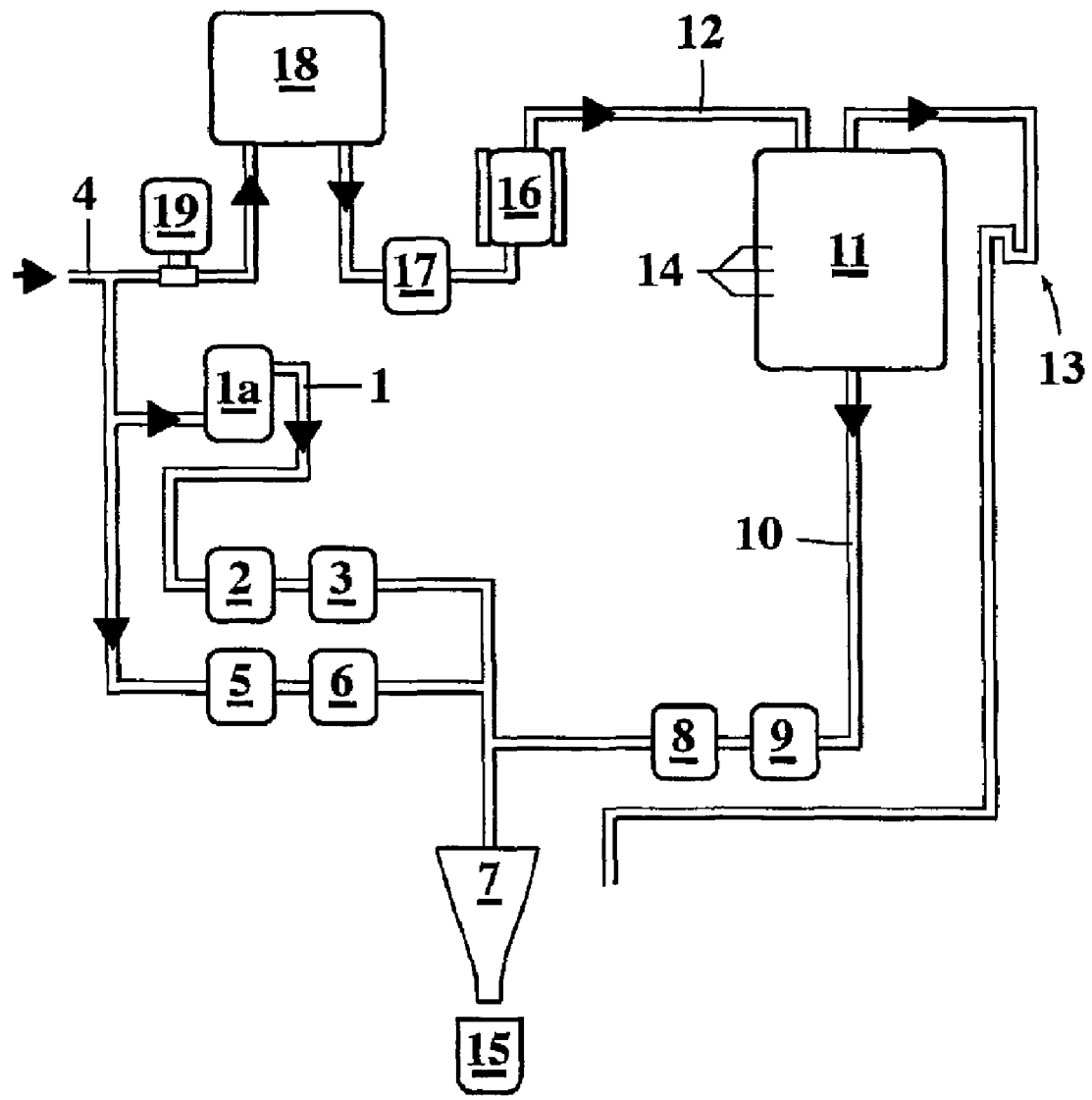
FIG. 1 is a schematic drawing of the coffee making arrangement according to the invention, which can be used to make both ordinary coffee and specialty coffee.
Figure 2:
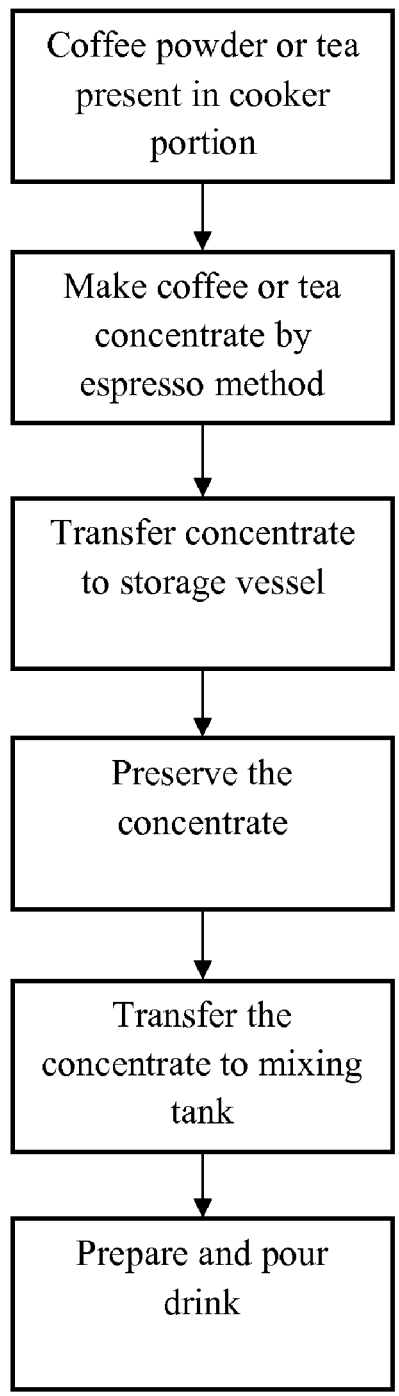
FIG. 2 is a flow chart of the method for making a coffee or tea drink according to an embodiment of the present invention.

Even though the following mainly describes the making of coffees and coffee drinks, it is obvious that the invention can also be applied to making tea and corresponding stimulant drinks, whereby, instead of coffee made by the espresso method, first, a corresponding tee concentrate is produced.

The following numerals are used in the figure:
1a Hot-water tank
1 Hot-water pipe
2 Valve
3 Control valve
4 Cold-water pipe
5 Valve
6 Control valve
7 Mixing tank
8 Control valve
9 Valve
10 Pipe from hermetic vessel to the mixer
11 Hermetically closed heat vessel
12 Pipe for fresh coffee concentrate/tea
13 Outlet pipe with air lock
14 Sensing elements for controlling the hermetic vessel
15 Serving dish
16 Pressure cooker for coffee/tea
17 Dosing valve
18 Pressure tank for hot water
19 Water pump According to our invention, coffee is made in the pressure cooker 16 by means of the espresso method. Water is introduced into the heated pressure tank 18 by means of the pump 19. Hot water from the pressure tank 18 is measured into the cooker 16. The amount of water is controlled using the valve 17. The prepared coffee concentrate travels along the pipe 12 into the hermetically sealed heat vessel 11. The coffee remains in the vessel for a selected dwell time. The dwell time can be selected in advance or, alternatively, it is determined in accordance with consumption. In the storage vessel 11, coffee concentrate is present in an amount of at least 2% of the volume of the vessel all the time, serving as a buffer. Air exits from the heat vessel 11 along the pipe 13 and gives way to the concentrate. The drink is selected by means of an option button, whereby the valve 9 opens and lets some concentrate through the valve 8 along the pipe 10 to the dispenser/mixer 7 and through there to the serving dish 15.

The "espresso method" herein refers to a manufacturing method, wherein the concentrate is extracted from a coffee powder that is in a compressed state, by compressing water at about 90 to 92° C. through it at a pressure of 6 to 10 bar in a very short time. Generally, the amount of coffee is very small, 7 to 15 g, preferably 8 to 12 g, e.g. about 10 g and, correspondingly, the amount of water only about 5 cm$^3$. The manufacturing time of the small amount is about 15 to 20 seconds, and making an amount twice as large should also take place within a short period of time (about 36 seconds).

Tea can also be made by the pressure cooker 16.

The hermetic heat vessel 11 herein refers to an essentially closed, airtight vessel, wherein, when the coffee concentrate rises in the vessel, a corresponding amount of air exits the vessel, for example, through an outlet pipe 13 provided with an air lock, or a similar valve system. Correspondingly, the amount of the air flowing into the vessel 11 through the air lock or the like is no larger than the amount of liquid exiting the vessel. The vessel is isolated from the ambient air, so that its contents remain unchanged. The amount of the extra air entering the vessel is exactly the same as the amount of liquid removed, leakage from the vessel being insignificant. The vessel is isolated, so that it is possible to keep the coffee concentrate at a temperature selected in advance. The vessel can also be heatable. The hermetic aspect of the heat vessel 11 makes it possible to keep the coffee concentrate fresh and flavoured.

According to an advantageous embodiment, the temperature in the storage vessel 11 can be within a range of 85 to 92° C., preferably 90 to 92° C.

The air lock can be, for example, a pipe that is bent so as to form a semi-arch, which has a downward mouth opening.

According to the drink selected and to ensure the correct taste nuance and temperature, hot water from the hot-water storage tank 1a can be added to the concentrate along the pipe 1 by means of the valve 2, in an amount controlled by the valve 3. To prevent evaporation and to obtain the right taste, serving temperature and appearance, a small amount of cold water must be added along the pipe 4 to the hot water in the pipe 1 by controlling the amount by means of the valve 6 and by opening the valve 5, when the hot water is taken from the steam generating, pressurized hot-water tank 1a. The hot-water storage tank can also be open and operate in normal pressure.

According to a preferred embodiment, the dwell time of the concentrate in the storage vessel 11 is from 2 min to 6 h, preferably from 10 min to 30 min. The temperature in the vessel 11 is preferably selected so that the temperature of the coffee concentrate will not change more than 2° C. during one hour. Both the storage vessel 11 and the mixing tank 7 work in normal pressure.

According to another preferred embodiment, the invention can also be implemented so that hot water is taken from an open hot-water tank that operates in normal pressure. In that case, hot water at a correct temperature can also be added to the concentrate along the pipe 1 by opening the valve 2, in an amount controlled by the valve 3; adding cold water is not necessary.

Water and the coffee concentrate blend, when the streams of coffee and water are combined. By virtue of the flow, homogenisation takes place in the mixing tank 7, and further in the serving dish 15. In the solution according to the invention, the mixing tank 7 can also be provided with a separate mixer.

According to an embodiment of the invention, the heat vessel 11 is provided with sensing elements 14, through which the coffee maker's program gives the cooker a command to prepare a concentrate.

In conclusion, the coffee concentrate prepared according to the invention is transferred 12 directly to the hermetically sealed heat vessel 11, from where it is measured into the final drink in portions suitable for the respective use. The coffee concentrate is hermetically stored in the vessel 11 and transferred to the mixing tank 7 immediately, preferably less than 5 minutes before serving. The desired amounts of hot and cold water are also transferred to the mixing tank along the pipes 1 and 4. The amount of water and that of the coffee concentrate are controlled by the valves.

According to a preferred embodiment of the invention, the hot milk and/or milky foam needed in the preparation of specialty coffees, such as cappuccino and café au lait, can be measured into the drink in the serving dish 15 from a separate milk container (not shown) by means of the steam heated by the milk foaming device simultaneously, but in a specific order, with the coffee.

Water can be added when making specialty coffees and also when preparing coffee drinks. Using hot water at a correct temperature, "ordinary" coffee with a desired strength, i.e., coffee that corresponds to filtered coffee is made from the coffee concentrate.

Water can also be used as addition when making tea drinks. In this way, a tea drink with a desired strength is obtained. Milk can also be added to the tea in the same manner as in the example of the specialty coffee described above.

The coffee concentrate can also be used as such for making coffee drinks and specialty coffees. In that case, no water is added into the mixing tank, and the coffee concentrate is measured into the serving dish as such without dilution.

The invention claimed is:

1. An apparatus for making coffee-based or tea-based drinks, the apparatus containing;
 a cooker portion which is capable of containing a coffee powder or tea and is used to make coffee or tea concentrate by an espresso method,
 a storage vessel for receiving coffee or tea concentrate from the cooker portion, wherein the storage vessel of the coffee or tea concentrate, which is connected to the cooker portion, contains an air lock and is hermetic to reduce oxidation of the concentrate, and contains a heating means to maintain the concentrate at a predetermined temperature, and
 a mixing tank, which is connected to the storage vessel and which has pipeline fittings for cold and hot water and a pipe fitting for taking the finished coffee or tea drink out of the equipment, whereby the mixing tank makes it possible to mix the coffee or tea concentrate and water in a suitable proportion so as to obtain a coffee or tea drink with a desired strength, whereby the storage vessel and the mixing tank are adapted to operate in normal pressure.

2. An apparatus according to claim 1, further comprising a means for keeping the temperature in the hermetic storage vessel between 85 and 92° C.

3. An apparatus according to claim 1, wherein hot and/or cold water can be added into the mixing tank.

4. An apparatus according to claim 1, wherein the amount of the coffee or tea concentrate as well as the cold and hot water entering the mixing tank can be controlled by means of valves in the pipelines.

5. An apparatus according to claim 1, wherein the arrangement is used for making tea and tea dinks.

6. An apparatus according to claim 1, wherein the concentrate is kept at substantially the same temperature in the storage vessel as it was made at.

7. An apparatus according to claim 6, in which the temperature is between 85° C. and 92° C.

8. An apparatus according to claim 6, in which the temperature is between 90° C. and 92° C.

9. A method for preparing coffee-based or tea-based drinks comprising the steps of:
 extracting a concentrate from a coffee powder or tea by means of an espresso method carried out by an apparatus containing a cooker portion which contains the coffee powder or tea to be used to make the concentrate and is used to make the concentrate from the coffee powder or tea by the espresso method,
 storing the extracted concentrate in a hermetic storage vessel having an air lock and being connected to the cooker portion, wherein the vessel reduces oxidation of the concentrate through the use of an air lock, is heatable, and operates at normal pressure, so that the concentrate is preserved for a specific dwell time at a predetermined temperature, and
 transferring the concentrate into a mixing tank that operates in normal pressure, to which mixing tank water is optionally measured in to from water pipelines so as to make a coffee or tea drink of a desired strength.

10. A method according to claim 9, wherein the temperature of the hermetic storage vessel is in a range of 85-92° C.

11. A method according to claim 9, wherein the dwell time of the concentrate in the storage vessel is 2 minutes to 6 hours, preferably from 10 minutes to 30 minutes.

12. A method according to claim 9, wherein the coffee concentrate is transferred into the mixing tank immediately before serving, preferably less than 5 minutes before serving.

13. A method according to claim 9, wherein 7 to 15 grams, preferably 8 to 12 grams of coffee/55 cm$^3$ of water is used for making the coffee concentrate.

14. A method according to claim 9, wherein hot and/or cold water are/is added into the mixing tank.

15. A method according to claim 9, wherein the amount of coffee concentrate and both cold and hot water, which enter the mixing tank, is controlled by valves that are in the pipelines.

16. A method according to claim 9, characterized in that hot water is added from a pressure tank.

17. A method for preparing coffee-based drinks, according to which method a coffee concentrate is extracted from a coffee powder by means of an espresso method wherein an apparatus containing a cooker portion that is capable of containing coffee powder and is used to make a concentrate from the coffee powder by the espresso method, and a hermetic storage vessel connected to the cooker portion, which vessel is isolated from ambient air via an air lock and heatable, and operating at normal pressure is used, the method comprising:
 making a coffee concentrate in the cooker portion from coffee powder by the espresso method,
 transferring the coffee concentrate made by the espresso method into the storage vessel,
 preserving the concentrate in the storage vessel, with a restricted amount of ambient air, for a specific dwell time at a predetermined temperature that is selected in advance, and
 transferring the concentrate from the storage vessel to a mixing tank that operates in normal pressure,
 pouring a coffee drink from the mixing tank into a serving dish.

18. A method according to claim 17, comprising adding water to the concentrate in the mixing tank so as to make a coffee drink having a desired strength, and pouring the coffee drink of the desired strength into a serving dish.

19. A method according to claim 17, in which the concentrate is kept at substantially the same temperature in the storage vessel as it was made at.

20. A method according to claim 19, in which the temperature is between 85° C. and 92° C.

21. A method according to claim 19, in which the temperature is between 90° C. and 92° C.

* * * * *